UNITED STATES PATENT OFFICE.

H. WALTER ALEXANDER, OF SAC CITY, IOWA, ASSIGNOR OF ONE-HALF TO B. R. GREENBLATT, OF OMAHA, NEBRASKA.

ART OF MOLDING.

1,239,152.   Specification of Letters Patent.   Patented Sept. 4, 1917.

No Drawing.   Application filed March 31, 1916. Serial No. 87,993.

*To all whom it may concern:*

Be it known that I, H. WALTER ALEXANDER, a citizen of the United States of America, and resident of Sac City, Sac county, Iowa, have invented a new and useful Improvement in the Art of Molding, of which the following is a specification.

The object of this invention is to provide an improvement in the art of casting metallic objects, which consists in forming a mold of clay or steatite in which a number of castings may be cast.

A further object of this invention is to provide a mold formed of clay or steatite, or a combination of the two substances, in powdered form, moistened with a solution of phosphoric acid.

A further object of this invention is to provide a mold which will retain heat and also retains the fine lines of a design molded or engraved therein, and which may be employed for a multiplicity of castings.

My invention consists in the method of forming a mold and in the composition of matter employed therein, as hereinafter set forth and pointed out in my claims.

In carrying out my improvement there are two substances which may be employed to gain the desired result, and these substances are clay, in practically all of its forms, and steatite, or soapstone.

One method of forming the mold is to pulverize or comminute the substance, using all clay, all steatite, or fifty per centum each of clay and steatite, moisten it with a solution of phosphoric acid, fashion the substance in the form of a mold around a pattern of the object to be molded, remove the pattern, dry the mold so formed, and fire it in a kiln. The quantity of phosphoric acid employed is not determined, being subject in each instance to the relative condition of the mineral substance in respect to moisture contained therein. This produces a substantial mold which may be employed for a great number of castings, and one which will hold the heat and retain fine lines of a design carried by the pattern.

Substantially the same result may be attained by the use of either mineral alone or by a mixture of the substances above mentioned, in substantially the proportions specified.

My mold may also be formed by fashioning a solid block in the same manner above described, from powdered clay or steatite or a combination of equal parts of the two substances, moistened with phosphoric acid, and carving or turning the desired design in the block so formed.

The steatite may be employed in solid blocks as it comes from the quarry, in the manner last above described, namely by carving a design in the block.

I have found that the mold formed as above described has the quality of holding the heat much better than any other mold I have ever used, and the mold is permanent and may be employed repeatedly for making castings of objects in metal without losing its efficiency or the fineness of its outlines. In this it is decidedly superior to the commonly used molds of plaster of Paris, paper, black lead, carbon, graphite, charcoal, sand or metal, for few of these substances will permit of more than one casting being made, and such as do have a more or less permanent form have other disadvantages.

The mold made as described according to my method will produce clean castings and will not crack nor deteriorate in use.

The use of phosphoric acid is advantageous in that it obviates the necessity of firing the clay or steatite mold in a kiln, as the phosphoric acid so used will evaporate readily or be driven off by baking the mold in an ordinary oven and permit the clay or steatite to harden and become susceptible of continuous use as a mold. The gases that form from the acid during the operation of baking are driven off through and form minute pores or vents in the mold, making the mold porous, and this aids in the casting of metal objects by providing a means for the escape of air and gases from the interior of the mold arising from or created by the metal on entering and settling in the mold.

I claim as my invention—

1. An improvement in the art of molding, which consists in forming a mold by comminuting a quantity of clay, moistening the same with phosphoric acid, fashioning the same around a pattern, and removing the pattern.

2. An improvement in the art of molding, which consists in the method of forming a mold by, first, comminuting a quantity of suitable substance, then, moistening the substance with phosphoric acid, then, fashioning the moistened substance around a pattern, then, removing the pattern and, finally, driving off the volatile content of the phosphoric acid by drying the fashioned composition.

3. An improvement in the art of molding, which consists in forming a mold by, first, pulverizing a quantity of clay, then, moistening the pulverized clay with phosphoric acid, then, fashioning the resultant composition around a pattern, then, removing the pattern and, finally, drying the fashioned composition.

4. An improvement in the art of forming molds, which consists in comminuting a quantity of suitable substance such as clay or steatite, then, moistening the substance with phosphoric acid, then, fashioning the resultant composition and, finally, drying the resultant composition, whereby the volatile content of said acid is driven off through the substance and causes the mold, so formed, to become porous in hardening.

5. An improvement in the art of forming molds, which consists in moistening a quantity of clay with phosphoric acid and permitting it to harden into desired shape by evaporation of the volatile content of the phosphoric acid, whereby the escape of said volatile content from said acid causes said mold to become porous.

6. A mold formed of suitable non-heat-conducting substance such as clay or steatite, and phosphoric acid.

Signed by me at Sac City, Iowa, this third day of March, 1916.

H. WALTER ALEXANDER.

Witnesses:
   S. E. WILHELM,
   F. W. LORING.